United States Patent
Nakano et al.

(10) Patent No.: US 7,980,376 B2
(45) Date of Patent: Jul. 19, 2011

(54) WET FRICTION PLATE

(75) Inventors: Yuta Nakano, Chitose (JP); Junji Ando, Kariya (JP)

(73) Assignees: Dynax Corporation, Chitose-shi (JP); JTEKT Corporation, Osaka-shi (JP)

( * ) Notice: Subject to any disclaimer, the term of this patent is extended or adjusted under 35 U.S.C. 154(b) by 381 days.

(21) Appl. No.: 12/180,855

(22) Filed: Jul. 28, 2008

(65) Prior Publication Data
US 2009/0032361 A1 Feb. 5, 2009

(30) Foreign Application Priority Data

Jul. 31, 2007 (JP) .................................. 2007-199296

(51) Int. Cl.
*F16D 69/00* (2006.01)
(52) U.S. Cl. .................... 192/107 M; 192/70.14; 29/458
(58) Field of Classification Search .................... None
See application file for complete search history.

(56) References Cited

U.S. PATENT DOCUMENTS

| | | | | |
|---|---|---|---|---|
| 3,899,050 A | * | 8/1975 | Savary et al. | 188/73.1 |
| 4,256,801 A | * | 3/1981 | Chuluda | 442/322 |
| 5,083,650 A | * | 1/1992 | Seiz et al. | 192/107 M |
| 6,524,681 B1 | * | 2/2003 | Seitz et al. | 428/143 |
| 6,534,170 B2 | * | 3/2003 | Mochida et al. | 428/336 |
| 7,096,561 B2 | | 8/2006 | Kinpara et al. | |
| 2005/0034830 A1 | | 2/2005 | Kimura et al. | |
| 2008/0199641 A1 | * | 8/2008 | Hasegawa et al. | 428/34.1 |

FOREIGN PATENT DOCUMENTS

| | | |
|---|---|---|
| JP | 09-133158 | 5/1997 |
| JP | 2003-240033 A | 8/2003 |

* cited by examiner

*Primary Examiner* — David D Le
*Assistant Examiner* — Jacob S Scott
(74) *Attorney, Agent, or Firm* — Howson & Howson LLP

(57) ABSTRACT

To control initial shudder in a wet paper friction plate, the frictional sliding surface of a wet paper friction member is preconditioned by frictional sliding contact with a mating plate until its bearing length ratio tp at a cutting depth of 10 μm is in the range from 70 to 85%. The preconditioning is optionally preceded by grinding, preferably before the wet paper friction member is attached to a base plate.

14 Claims, 6 Drawing Sheets

Example 1

Bearing area curve of profile curve

Frictional property

Example 2

Bearing area curve of profile curve

Frictional property

Comparative Example 1

Bearing area curve of profile curve

Frictional property

Comparative Example 2

WET FRICTION PLATE

CROSS-REFERENCE TO RELATED APPLICATION

This application claims priority on the basis of Japanese patent application 199296/2007, filed Jul. 31, 2007. The disclosure of Japanese application 199296/2007, is hereby incorporated by reference.

FIELD OF THE INVENTION

This invention relates to a wet friction plate of the kind used in the automatic transmission of vehicles such as four-wheel drive vehicles.

BACKGROUND ART

A conventional wet friction plate has an erratic pattern of irregularities on the surface that frictionally engages a mating plate. These irregularities sometimes cause abnormal noises and vibration upon engagement of a clutch or a brake incorporating the friction plate. The generation of noise and vibration is referred to as "initial shudder".

The problem of controlling shudder is addressed in Unexamined Japanese Patent Publication No. 133158/1997. However, the approach described in the Japanese Patent Publication is to control the thickness of oil films between wet friction plates. This approach requires a complex structure to achieve and maintain an oil film having optimal thickness, and the complex structure, in turn results in a high manufacturing cost.

The present invention provides a wet friction plate which is capable of controlling initial shudder at low cost.

SUMMARY OF THE INVENTION

In general, in accordance with the invention, a paper friction member is made to have a bearing length ratio within a specified range in which especially good performance in terms of shudder avoidance is achieved.

The term "bearing length ratio," represented by the symbol tp, expresses the sum of the lengths of line segments obtained by cutting a waviness profile of a surface by a straight line, parallel to a mean line and lower than the highest point in the waviness profile by a cutting depth, over a specified interval of measurement. The relationship between the sum of the lengths of these line segments and the cutting depth can be represented by a bearing area curve, in which the abscissa is the bearing length ratio tp, which is the sum of the line segments divided by the selected measurement interval, and the ordinate is the cutting depth, measured from the highest point in the waviness profile.

More specifically, the wet friction plate in accordance with the invention comprises a paper friction member attached to a base plate, the paper friction member having a frictional sliding surface wherein the bearing length ratio, tp, on a bearing area curve for the frictional sliding surface is in the range from 70-85%, at a cutting level of 10 μm from the top of a waviness profile curve, with a length of measurement of 8 mm.

A wet paper friction member is produced by dispersing a mixture of a fibrous base material such as pulp and a friction modifier in water and making a paper sheet therefrom. The paper sheet is then dried, impregnated with thermosetting resin, and then subjected to heat-hardening and pressure forming. The specified bearing length ratio is achieved by a interim preconditioning operation in which the wet paper friction member is brought into sliding contact with a mating plate. Preferably, the frictional sliding surface of the wet paper friction member is brought into contact with a steel plate, and the friction member and steel plate are subject to pressure and relative rotation at a speed and torque such as to dissipate approximately 4 to 4.5 kW of power.

As an alternative, the bearing length ratio tp of the frictional sliding surface of the paper friction member can be brought to the specified range of 70-85% at a cutting level of 10 μm by grinding the frictional sliding surface before the paper friction member is attached to its base plate, and, after the paper friction member is attached to the base plate, carrying out a interim preconditioning operation in which the wet paper friction member is brought into sliding contact with a mating plate. Here again, the preconditioning is preferably carried out at a speed and torque such that the power dissipated is in the range from approximately 4 to 4.5 kW.

The bearing area curve is preferably derived from a raw trace of the waviness profile because the condition of contact with the mating plate is considered important.

The length of measurement was set at 8 mm in order to enable consistent evaluation of the anti-shudder properties of paper friction members of various sizes. The cutting level of 10 μm was selected because the frictional sliding surface of a paper friction member according to the invention becomes compressed by about 10 μm when in use and under load. The measurement of a waviness profile curve is specified in Japanese Industrial Standard JIS-B0601.

BRIEF DESCRIPTION OF THE DRAWINGS

FIG. 1, part (b) is a schematic sectional view of a wet friction plate which underwent a interim preconditioning operation after the paper friction member was attached to the base plate;

FIG. 2(a) shows a surface profile of a wet friction plate which was prepared without preconditioning, and which exhibits initial shudder;

FIG. 2(b) shows the surface profile of a wet friction plate which underwent an interim preconditioning operation utilizing a torque and pressure such as to expend 4-4.5 kW of power, and which was free from initial shudder;

FIG. 2(c) shows the surface profile of a wet friction plate which underwent surface grinding followed by interim preconditioning at a power level in the range from 4-4.5 kW, and which was also free from initial shudder;

DETAILED DESCRIPTION OF THE PREFERRED EMBODIMENTS

In the description that follows, the term "specified bearing length ratio tp" refers to a bearing length ratio tp on a bearing area curve at a cutting level of 10 μm from the top of the waviness profile curve from which the bearing area curve was derived, using a measurement length of 8 mm.

Figure 1:
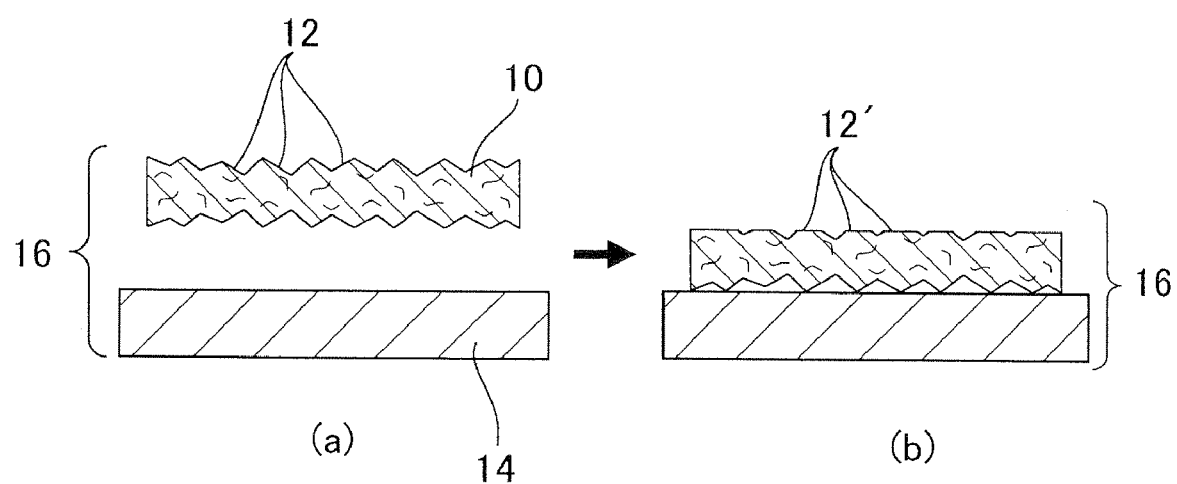
FIG. 1, part (a), is a schematic view illustrating a condition in which a paper friction member is yet to be attached to a base plate.

In FIG. 1, part (a), the frictional sliding surface 12 of paper friction member 10, was not subjected to special processing. Its specified bearing length ratio tp is generally in the range from about 25-35%. In FIG. 1(b), a clutch friction plate 16 has a frictional sliding surface 12' on which the specified bearing length ratio tp is caused to be in the range from 70-85% by interim preconditioning of the frictional sliding surface using a mating plate.

The interim preconditioning operation is a process in which a wet paper friction member slid against a steel plate. Specifically, a clutch, e.g., a clutch assembly ready to be installed in a vehicle, is subjected to a predetermined pressure and differential rotation over an interval of time.

The amount of power (power being equivalent to the product of torque and relative rotational speed) applied to the frictional sliding surface 12 in the interim preconditioning operation is preferably in the range from 4 to 4.5 kW.

Again referring to FIG. 1, in a second embodiment of the invention, the specified bearing length ratio tp of the frictional sliding surface 12 is brought to a range from 70-85% through a two-step procedure in which the frictional sliding surface 12 of a paper friction member 10 is ground before the paper friction member 10 is attached to the base plate 14. Then an interim preconditioning operation is carried out on the paper friction member 10 using a mating plate.

In the second embodiment, because the frictional sliding surface 12 undergoes grinding before the interim preconditioning operation, a shorter time is required for the interim preconditioning operation to bring the bearing length ratio tp into the range of 70-85%.

Figure 2A:
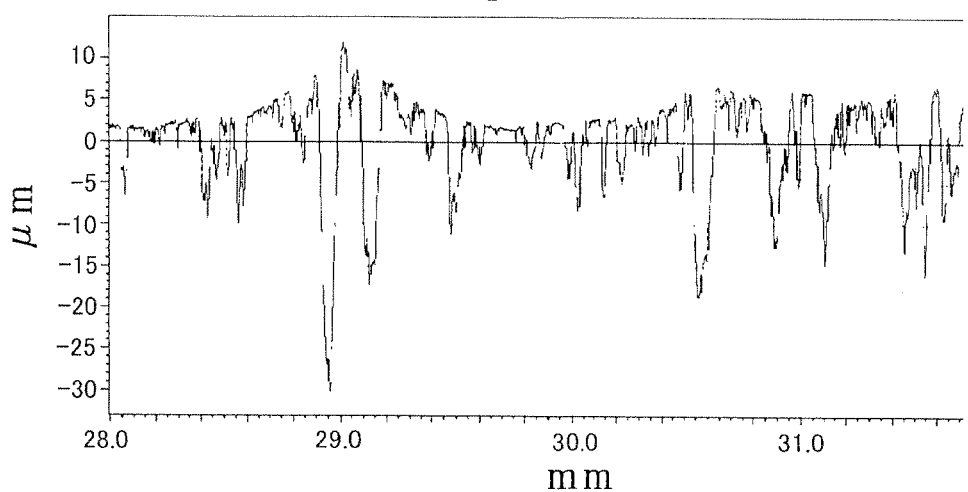
FIGS. 2(a), 2(b) and 2(c) show surface waviness profiles, obtained in accordance with Japanese Industrial JIS-B0671 for three wet friction plates.
Figure 2B:
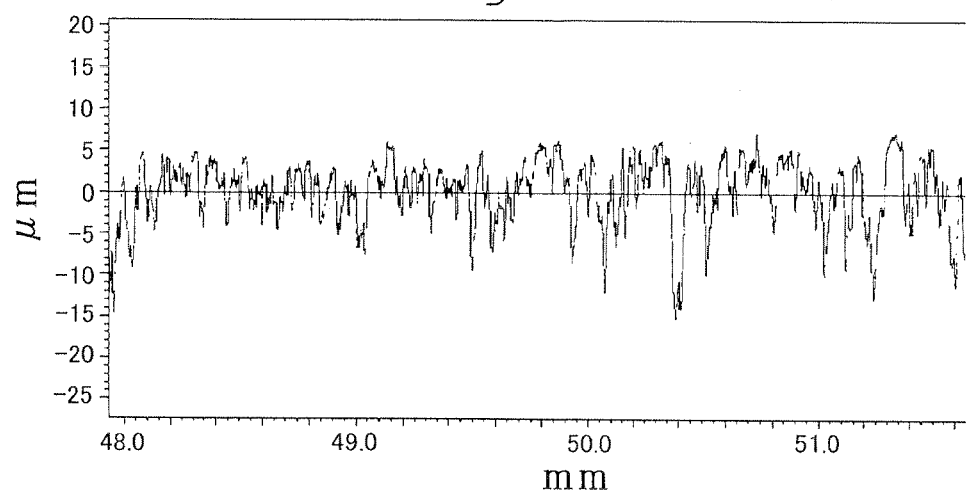
Figure 2C:
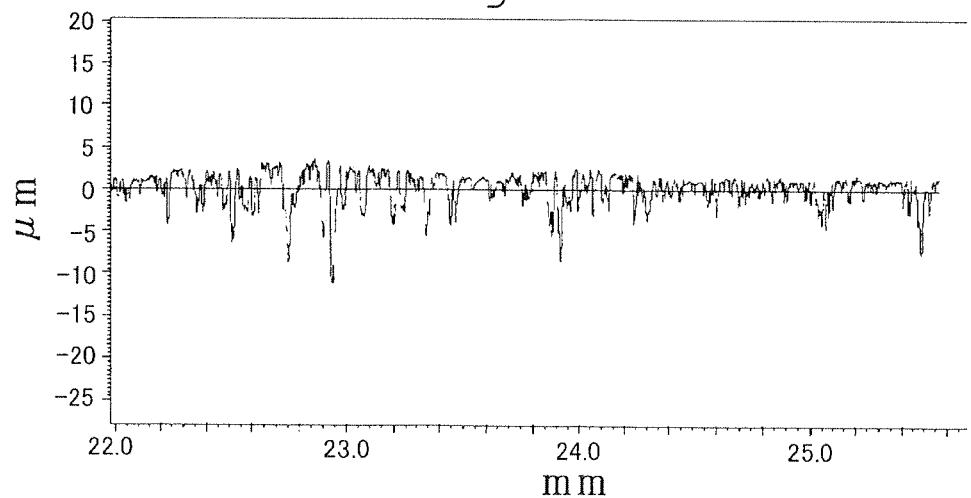

FIGS. 2(a), 2(b) and 2(c) show surface roughness profiles obtained according to JIS-B0671. FIG. 2(a) shows the surface roughness profile of a wet friction plate without the interim preconditioning operation. With this surface roughness profile, initial shudder can be expected. FIG. 2(b) shows the surface roughness profile of a wet friction plate which underwent the interim preconditioning operation with a power expenditure of 4-4.5 kW. This friction plate was found to be free from initial shudder. FIG. 2(c) shows the surface roughness profile of a wet friction plate which underwent the interim preconditioning operation at a power expenditure of 4-4.5 kW, after grinding of the surface. This friction plate was also found to be and free from initial shudder.

FIGS. 2(a), 2(b) and 2(c) confirm that a wet friction plate which underwent the interim preconditioning operation at a power expenditure in the range from 4-4.5 kW to reach the specified bearing length ratio, with or without preliminary grinding, had a greater smoothness compared to that of the a wet friction plate which caused initial shudder.

EXAMPLES

Examples 1 and 2 were produced to demonstrate the frictional properties of wet friction plates according to the invention, having specified bearing length ratios tp of 70% and 85%, respectively.

For comparison, Comparative Examples 2 and 3 were produced to demonstrate the frictional properties of wet friction plates having specified bearing length ratios tp of 40% and 90% respectively.

Figure 3A:
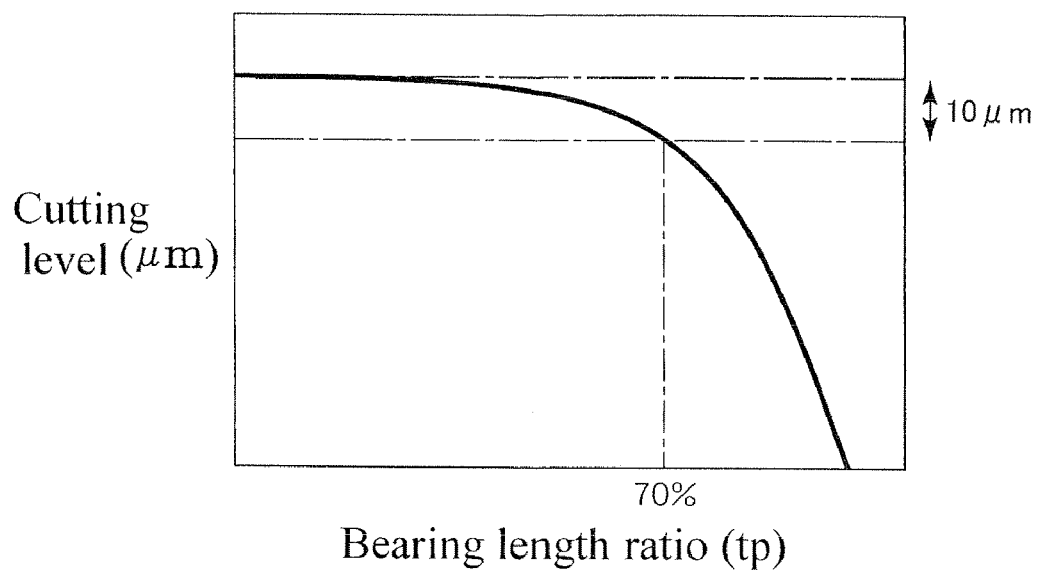
FIG. 3(a) is a bearing area curve for a first embodiment of the invention.
Figure 3B:
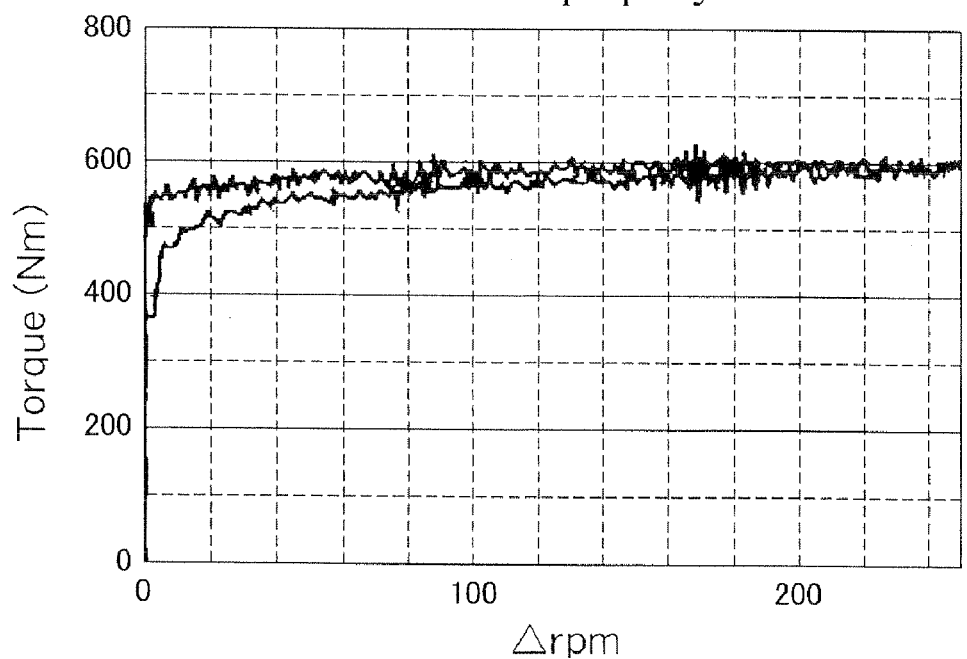
FIG. 3(b) is a graph showing torque vs. rotation rate for a wet friction plate having the properties depicted in FIG. 3(a), thereby illustrating the frictional property of the same.

The bearing area curves and frictional properties of Example 1 are shown in FIGS. 3(a) and 3(b) respectively, and the bearing area curves and frictional properties of Example 2 are shown in FIGS. 4(a) and 4(b) respectively.

Figure 5A:
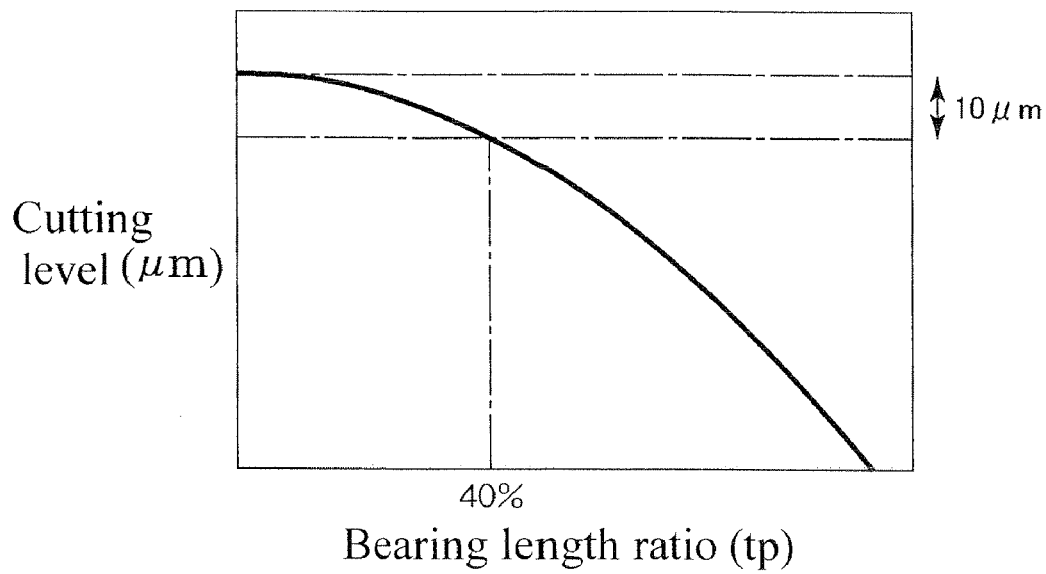
FIG. 5(a) is a bearing area curve for a first comparative example in which the bearing length ratio tp is below the range of 70-85%.
Figure 5B:
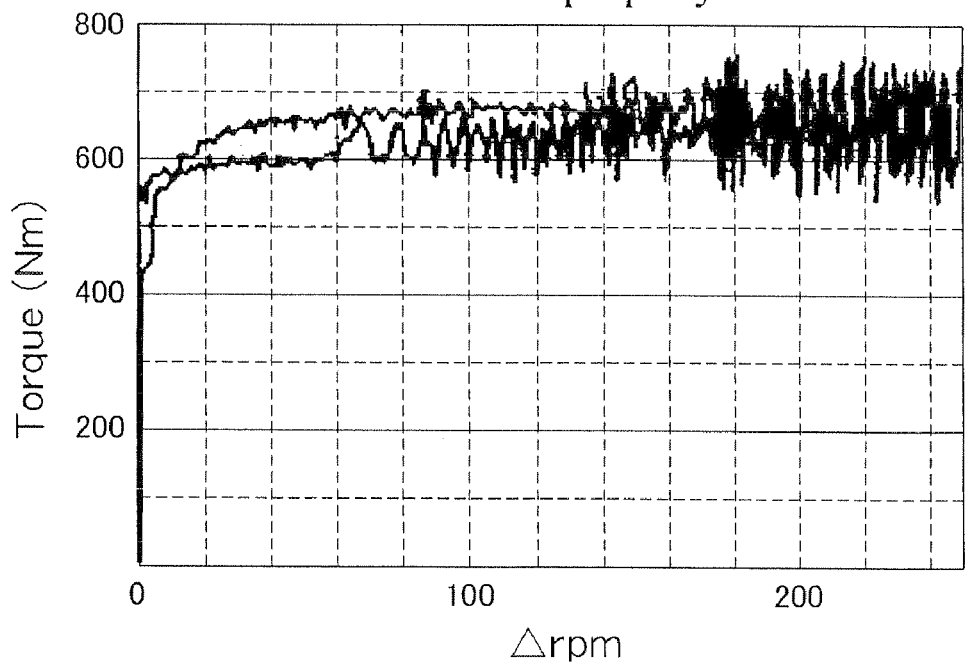
FIG. 5(b) is a graph showing torque vs. rotation rate for a wet friction plate having the properties depicted in FIG. 5(a), thereby illustrating the frictional property of the same.
Figure 6A:
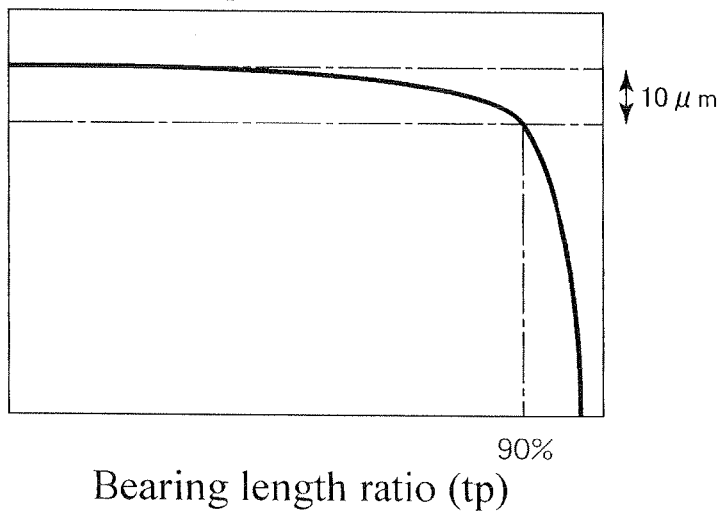
FIG. 6(a) is a bearing area curve for a first comparative example in which the bearing length ratio tp is above the range of 70-85%.
Figure 6B:
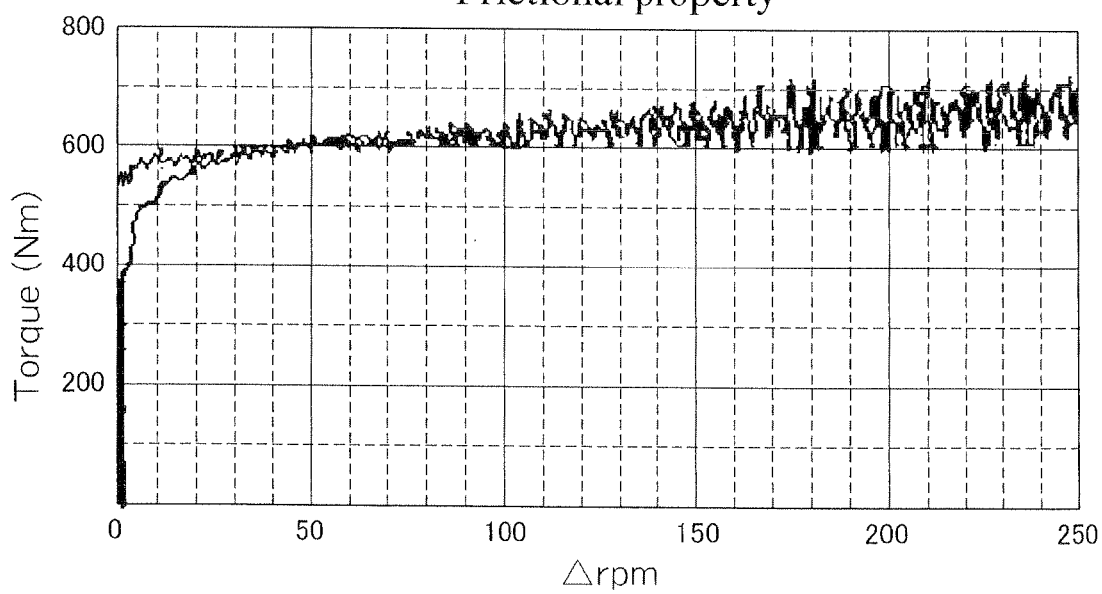
FIG. 6(b) is a graph showing torque vs. rotation rate for a wet friction plate having the properties depicted in FIG. 6(a), thereby illustrating the frictional property of the same.

FIGS. 5(a) and 5(b) show the bearing area curve and frictional property of Comparative Example 1, and FIGS. 6(a) and 6(b) shows the bearing area curve and the frictional property of Comparative Example 2.

In each of FIGS. 3(b), 4(b), 5(b) and 6(b), two lines represent torque as the relative rotation of the friction plate and the mating plate was increased and then decreased under load.

Figure 4:
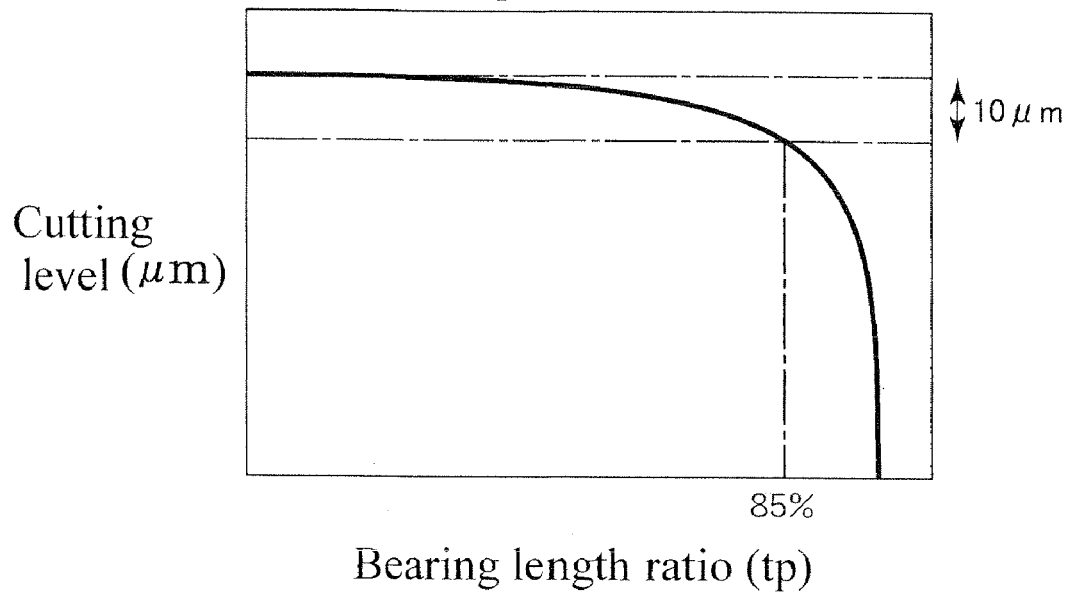
FIG. 4(a) is a bearing area curve for a second embodiment of the invention.
FIG. 4(b) is a graph showing torque vs. rotation rate for a wet friction plate having the properties depicted in FIG. 4(a), thereby illustrating the frictional property of the same.
Figure 4:
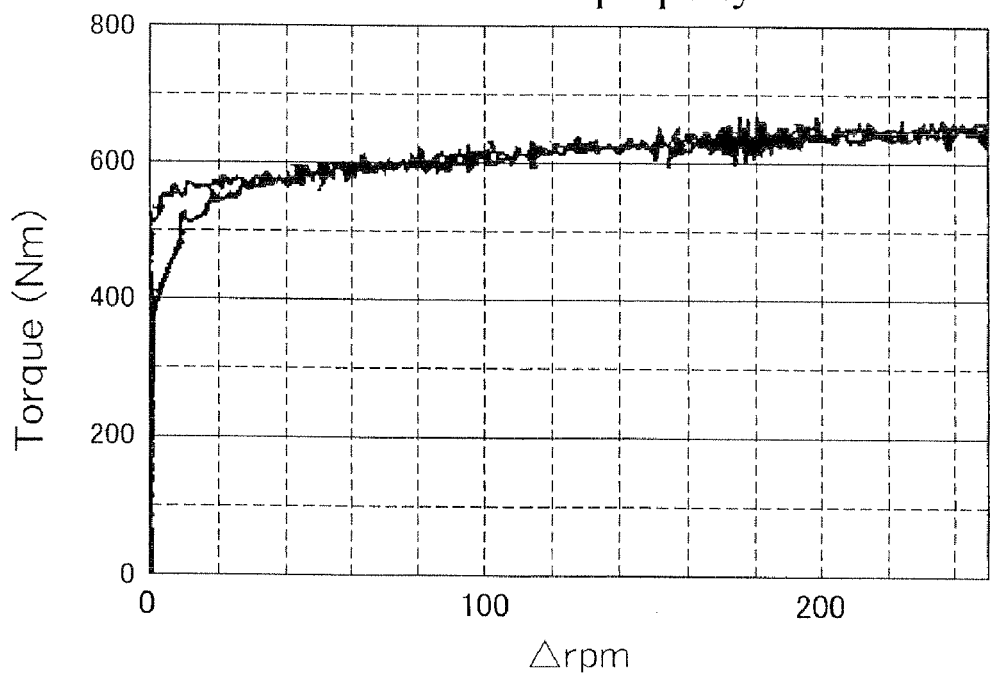

As shown in FIGS. 3 and 4, where the bearing length ratio tp was 70% and 85%, respectively, the friction plates exhibited stable frictional properties and experienced no initial shudder. On the other hand, as shown in FIGS. 5 and 6, in the case of Comparative Example 1, where the specified bearing length ratio tp was 40%, and Comparative Example 2 where the specified bearing length ratio tp was 90%, the friction plates exhibited unstable frictional properties and caused initial shudder.

Thus, it can be seen that the wet friction plate of this invention is capable of controlling initial shudder. Moreover, the wet friction plate of the invention is capable of controlling initial shudder at a relatively low cost, because the techniques by which it is manufactured, interim preconditioning, and surface grinding followed by interim preconditioning, can both be carried out at a low cost compared to that of conventional techniques for addressing the problem of initial shudder in a wet friction plate.

What is claimed is:

1. A newly manufactured wet friction plate comprising a paper friction member attached to a base plate, said paper friction member having a frictional sliding surface, wherein the bearing length ratio, tp, on a bearing area curve for said frictional sliding surface is in the range from 70-85%, at a cutting level of 10 μm from the top of a waviness profile curve, with a length of measurement of 8 mm, whereby the friction plate minimizes initial shudder when first placed into use.

2. The wet friction plate as claimed in claim 1, in which the bearing length ratio tp of the frictional sliding surface of the paper friction member is made to range from 70-85% by an interim preconditioning operation in which the wet paper friction member is brought into sliding contact with a mating plate.

3. The wet friction plate as claimed in claim 1, in which the bearing length ratio tp of the frictional sliding surface of the paper friction member is made to range from 70-85% by grinding said frictional sliding surface before the paper friction member is attached to the base plate, and, after the paper friction member is attached to the base plate, carrying out a interim preconditioning operation in which the wet paper friction member is brought into sliding contact with a mating plate.

4. The wet friction plate according to claim 2, in which the interim preconditioning operation is carried out by rotating the wet paper friction member relative to the mating plate, and in which the amount of power exerted in the interim preconditioning operation is equivalent to the product of the torque applied in said rotating step and the relative rotational speed of the wet paper friction member and said mating plate.

5. The wet friction plate according to claim 2, in which the amount of power exerted in the interim preconditioning operation is at least 4 kW.

6. The wet friction plate according to claim 3, in which the interim preconditioning operation is carried out by rotating the wet paper friction member relative to the mating plate, and in which the amount of power exerted in the interim preconditioning operation is equivalent to the product of the torque applied in said rotating step and the relative rotational speed of the wet paper friction member and said mating plate.

7. The wet friction plate according to claim 3, in which the amount of power exerted in the interim preconditioning operation is at least 4 kW.

8. A method of making a wet friction plate, carried out before the wet friction plate is first placed into use, comprising the steps of making a paper friction member having a frictional sliding surface, and bringing the frictional sliding surface of the paper friction member into sliding contact with a mating plate until the bearing length ratio, tp, on a bearing area curve for said frictional sliding surface is in the range from 70-85%, at a cutting level of 10 μm from the top of a waviness profile curve for said frictional sliding surface, with a length of measurement of 8 mm.

9. The method according to claim 8, in which the step of bringing the frictional sliding surface of said paper friction member into sliding contact with a mating plate is preceded by grinding said frictional sliding surface.

10. The method according to claim 8, in which the step of bringing the frictional sliding surface of said paper friction member into sliding contact with a mating plate is preceded by the steps of grinding said frictional sliding surface, and, following said grinding step, attaching said paper friction member to a base plate.

11. The method according to claim 9, in which the step of bringing the frictional sliding surface of the paper friction member into sliding contact with a mating plate is carried out by rotating the paper friction member relative to the mating plate, and in which the amount of power exerted in said rotating step is equivalent to the product of the torque applied in said rotating step and the relative rotational speed of the paper friction member and said mating plate.

12. A wet friction plate according to claim 9, in which in which the step of bringing the frictional sliding surface of the paper friction member into sliding contact with a mating plate is carried out by rotating the paper friction member relative to the mating plate, and the amount of power exerted in said rotating step is at least 4 kW.

13. The method according to claim 10, in which the step of bringing the frictional sliding surface of the paper friction member into sliding contact with a mating plate is carried out by rotating the paper friction member relative to the mating plate, and in which the amount of power exerted in said rotating step is equivalent to the product of the torque applied in said rotating step and the relative rotational speed of the paper friction member and said mating plate.

14. A wet friction plate according to claim 10, in which the step of bringing the frictional sliding surface of the paper friction member into sliding contact with a mating plate is carried out by rotating the paper friction member relative to the mating plate, and the amount of power exerted in said rotating step is at least 4 kW.

* * * * *

UNITED STATES PATENT AND TRADEMARK OFFICE
Certificate

Patent No. 7,980,376 B2                                                              Patented: July 19, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yuta Nakano, Chitose (JP); Junji Ando, Kariya (JP); and Hideyuki Saito, Aichi-ken (JP).

Signed and Sealed this Fourteenth Day of January 2014.

*DAVID D. LE*
*Supervisory Patent Examiner*
*Art Unit 3655*
*Technology Center 3600*